United States Patent
Li et al.

(10) Patent No.: US 10,338,636 B2
(45) Date of Patent: Jul. 2, 2019

(54) COMPUTING DEVICE WITH KEYBOARD MODE

(71) Applicant: Lenovo (Singapore) Pte. Ltd., Si (SG)

(72) Inventors: Scott Wentao Li, Cary, NC (US);
Robert James Kapinos, Durham, NC (US); Russell Speight VanBlon, Raleigh, NC (US); Timothy Winthrop Kingsbury, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/706,707

(22) Filed: Sep. 16, 2017

(65) Prior Publication Data

US 2019/0086955 A1    Mar. 21, 2019

(51) Int. Cl.
*G09G 5/00* (2006.01)
*G06F 1/16* (2006.01)
*G06F 3/02* (2006.01)
*G06F 1/26* (2006.01)

(52) U.S. Cl.
CPC .......... *G06F 1/1618* (2013.01); *G06F 1/1681* (2013.01); *G06F 3/0227* (2013.01); *G06F 1/26* (2013.01)

(58) Field of Classification Search
CPC .... G06F 1/1616; G06F 1/1618; G06F 1/1643; G06F 1/1649; G06F 1/1681; G06F 1/1692; G06F 1/26; G06F 3/0227; G06F 3/041; G06F 3/0416; G06F 3/04817; G06F 3/0484; G06F 3/0486; G06F 3/04883; G06F 2203/04105; G06F 2203/04808
See application file for complete search history.

(56) References Cited

U.S. PATENT DOCUMENTS

| | | | |
|---|---|---|---|
| 2005/0025551 A1* | 2/2005 | Katz | G06F 1/1626 400/472 |
| 2010/0039764 A1* | 2/2010 | Locker | G06F 1/1615 361/679.29 |
| 2010/0142139 A1* | 6/2010 | Szabolcsi | G06F 1/1616 361/679.27 |
| 2011/0141044 A1* | 6/2011 | Suzukawa | G06F 1/1616 345/173 |
| 2012/0327580 A1* | 12/2012 | Gengler | G06F 1/1626 361/679.09 |

(Continued)

OTHER PUBLICATIONS

Davidson et al., Chapter 4. GATT (Services and Characteristics), Getting Started with Bluetooth Low Energy, Publisher: O'Reilly Media, Inc., Release Date: May 2014, ISBN: 9781491900550 (20 pages).

(Continued)

*Primary Examiner* — Joe H Cheng
(74) *Attorney, Agent, or Firm* — Brian J. Pangrle

(57) ABSTRACT

A device can include a processor; memory operatively coupled to the processor; a display housing that includes a display operatively coupled to the processor; a keyboard housing that includes a keyboard; a hinge assembly that operatively couples the display housing and the keyboard housing for transitions between an closed orientation, an open orientation and a folded orientation; and wireless communication circuitry that, in a wireless keyboard mode of the folded orientation, operatively couples to the keyboard.

18 Claims, 8 Drawing Sheets

(56) References Cited

U.S. PATENT DOCUMENTS

| | | | |
|---|---|---|---|
| 2013/0027364 A1* | 1/2013 | Kim | G06F 9/4443 345/204 |
| 2013/0050090 A1* | 2/2013 | Stewart | G06F 3/04886 345/168 |
| 2015/0116362 A1* | 4/2015 | Aurongzeb | H04N 7/15 345/650 |
| 2015/0277509 A1* | 10/2015 | Probst | G06F 1/1616 361/679.12 |
| 2015/0370339 A1* | 12/2015 | Ligtenberg | G06F 1/1662 345/168 |
| 2016/0091929 A1* | 3/2016 | Kwong | G06F 1/1639 345/173 |
| 2018/0188773 A1* | 7/2018 | Perelli | G06F 1/165 |
| 2018/0188774 A1* | 7/2018 | Ent | G06F 1/165 |
| 2018/0210508 A1* | 7/2018 | Aurongzeb | G06F 1/1669 |
| 2018/0210514 A1* | 7/2018 | Wang | G06F 1/1694 |
| 2018/0210515 A1* | 7/2018 | Lyles | G06F 1/1694 |
| 2018/0373292 A1* | 12/2018 | Perelli | G06F 1/1649 |
| 2018/0373294 A1* | 12/2018 | Perelli | G06F 1/1658 |

OTHER PUBLICATIONS

HID Over GATT Profile Specification, V10r00, HID Working Group, Dec. 27, 2011 (38 pages).
Frenzel, L., The Fundamentals of Short-Range Wireless Technology, Electronic Design, Oct. 11, 2012, (http://www.electronicdesign.com/communications/fundamentals-short-range-wireless-technology) (13 pages).
Jiang, N., Texas Instruments, Ti Designs, Bluetooth Low Energy Keyboard Reference Design, TIDU548, Oct. 2014 (15 pages).

* cited by examiner

COMPUTING DEVICE WITH KEYBOARD MODE

TECHNICAL FIELD

Subject matter disclosed herein generally relates to technology for computing or other devices.

BACKGROUND

Various types of devices, display devices, computing and display devices, etc. exist where, for example, a hinge assembly allows for orienting one portion with respect to another portion. For example, a display portion may be oriented with respect to a keyboard portion.

SUMMARY

A device can include a processor; memory operatively coupled to the processor; a display housing that includes a display operatively coupled to the processor; a keyboard housing that includes a keyboard; a hinge assembly that operatively couples the display housing and the keyboard housing for transitions between an closed orientation, an open orientation and a folded orientation; and wireless communication circuitry that, in a wireless keyboard mode of the folded orientation, operatively couples to the keyboard. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
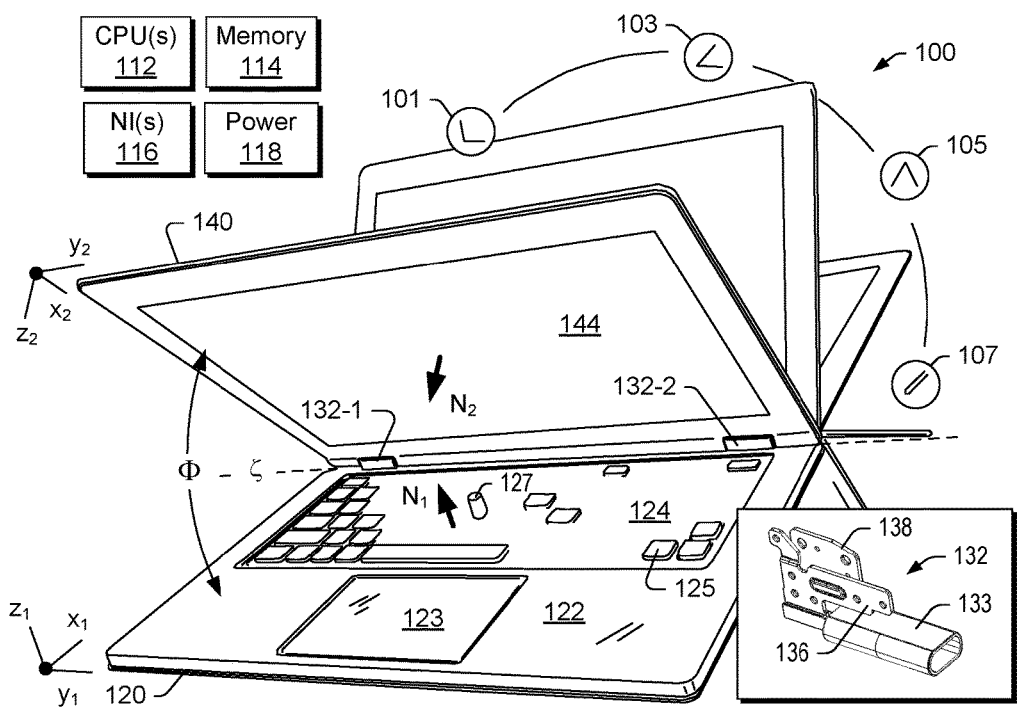
FIG. 1 is a diagram of an example of a device.
Figure 1:
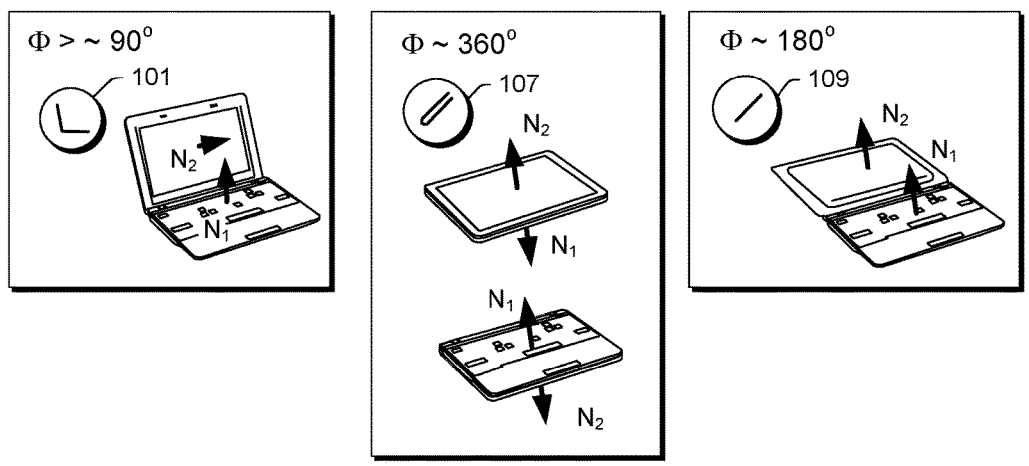

FIG. 1 shows an example of a device 100 that includes a keyboard housing 120 and a display housing 140 that are pivotable with respect to each other via movement about one or more hinges 132-1 and 132-2 (e.g., hinge assemblies). An example of a hinge assembly 132 is shown in a perspective view where the hinge assembly includes two saddles 136 and 138 and a housing 133 where, for example, the housing 133 may covers gears that mesh two axles where one of the axles is connected to one saddle 136 (e.g., a keyboard housing saddle) and where another one of the axles is connect to the other saddle 138 (e.g., a display housing saddle). The hinge assembly 132 may allow for approximately 0 degree to approximately 360 degree orientations of the housings 120 and 140, for example, the hinge assembly 132 as shown may correspond to a closed clamshell orientation of the housings 120 and 140 or to a tablet orientation of the housings 120 and 140.

In the example of FIG. 1, the device 100 may be a device such as, for example, a computing device (e.g., an information handling device). The device 100 may be described by a form factor and referred to as a laptop computer or a notebook computer (e.g., a "laptop" or "notebook"). As an example, a display carried by a display housing may be described by a diagonal dimension, which may be, for example, a diagonal dimension in a range from about 10 cm to about 50 cm. As to thickness of a housing, a display housing may be about 3 cm or less and a keyboard housing may be about 3 cm or less.

As an example, the device 100 may include one or more processors 112, memory 114 (e.g., one or more memory devices), one or more network interfaces 116, and one or more power cells 118. Such components may be, for example, housed with the keyboard housing 120, the display housing 140, or the keyboard housing 120 and the display housing 140. In such an example, the memory 144 can be accessible by at least one of the one or more processors 112 and, for example, one or more of the one or more network interfaces 116 may be operatively coupled to one or more of the one or more processors 112.

As an example, at least one of the network interfaces 116 may include circuitry that can operate without operation of one of the one or more processors 112. For example, a network interface can include a microcontroller and/or other circuitry that can process information that can be transmitted by the network interface, which may be a wireless network interface (e.g., WiFi technology, BLUETOOTH® technology, IR technology, etc.). As an example, a wireless network interface may operate according to one or more standards, which may be defined in part by one or more distance metrics (e.g., consider a short-range wireless communication standard).

As to BLUETOOTH® technology, the Bluetooth Special Interest Group (SIG) manages the standard; noting that it is also covered by IEEE 802.15.1 (Institute of Electrical and Electronics Engineers). BLUETOOTH® technology can operate in the 2.4 GHz ISM band and can use frequency-hopping spread spectrum with Gaussian frequency shift keying (GFSK), differential quadrature phase shift keying (DQPSK), or eight-phase-shift differential phase-shift keying (8DPSK) modulation. A basic data gross rate is approximately 1 Mbit/s for GFSK, approximately 2 Mbits/s for DQPSK, and approximately 3 Mbits/s for 8DPSK. BLUETOOTH® technology can also include different power classes (e.g., 0 dBm (1 mW), 4 dBm (2.5 mW), and 20 dBm (100 mW)); noting that power class can determine range (e.g., distance of coverage). As an example, a standard range may be about 10 meters and up to 100 meters at maximum power with a clear path (e.g., line-of-sight).

BLUETOOTH® technology may be implemented to form a network of devices (e.g., two or more devices and generally less than about 10 devices). Such a network may be referred to as a piconet. As an example, a peer-to-peer communications mode may be implemented using BLUETOOTH® technology. The BLUETOOTH® SIG defines multiple "profiles" or software applications that have been certified for interoperability among vendor integrated circuit chips, modules, and software.

As to infrared (IR) wireless technology, it can utilize electromagnetic energy that is in the infrared portion of the electromagnetic energy spectrum. Infrared may be considered a low-frequency, invisible light that can serve as a carrier of high-speed digital data. For example, consider a wavelength range of approximately 850 µm to approximately 940 µm. As an example, a transmitter can be an IR LED (light emitting diode), and a receiver can be a diode photodetector and amplifier. As an example, an IR wave may be modulated with a high-frequency signal that is, in turn, coded and modulated by the digital data to be transmitted.

Various electronic devices utilize an IR remote control, which may have a range of several meters and may have an associated angle or field of view (FOV). As an example, an IR remote control unit may have a relatively narrow angle (e.g., less than about 30 degrees) of transmission. Various protocols and coding schemes may be implemented for IR technology. IR devices tend to operative via a clear line-of-sight path for a connection.

Another technology for data transmission is called IrDA technology, a standard maintained by the Infrared Data Association. IrDA exists in various versions, which may be delineated by data rate. For example, data rates may range from a low of about 9.6 to about 115.2 kbits/s with increases in increments to about 4 Mbits/s, about 16 Mbits/s, about 96 Mbits/s, and about 512 Mbits/s to about 1 Gbit/s or more (e.g., consider rates of 5 and 10 Gbits/s or more). As to range, IrDA may be suitable for transmissions that are about a few meters or less.

IR technology can be relatively robust as to radio interference and can be secure (e.g., its signals may be difficult to intercept or spoof).

Another example of a technology for transmission of information is referred to as visible light communication (VLC), which may, for example, utilize visible light between approximately 400 THz and approximately 800 THz (e.g., approximately 780 nm and approximately 375 nm). VLC is a subset of optical wireless communications technologies.

As an example, VLC may utilize one or more LEDs, which may, for example, provide for suitable rates of data transmission as associated with a human input device (HID) such as a keyboard. VLC may provide for rates as high as 500 Mbit/s or more.

As an example, one or more devices can include one or more photodiodes that can receive signals from one or more light sources of one or more other devices. As an example, the device 100 may include one or more light sources that can emit light detectable by one or more devices that include one or more photodiodes. As an example, an image sensor may be utilized to detect emitted light, which may be an array of photodiodes (e.g., corresponding to pixels). As an example, a light sensor may provide for single channel communication, a light sensor may provide for multi-channel communication (e.g., consider 1 pixel equating to 1 channel), a light sensor may provide for spatial awareness of multiple light sources, etc.

As an example, a network interface can utilize one or more wavelengths of electromagnetic energy, which may include electromagnetic energy with one or more of a radio frequency, a microwave frequency, an IR frequency, a visible light frequency, etc. As an example, a network can be a network of two or more devices.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick 127, which may be a TRACKPOINT® controller, etc.). As an example, the frontal surface 122 may be a surface suitable for resting a palm or palms of a hand or hands.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. As an example, the device 100 may include a single hinge that allows for pivoting a keyboard housing with respect to a display housing such that keys of the keyboard housing can be oriented to face a back side of a display. In such an approach, a user may spin the keyboard housing by 180 degrees about a central axis of the single hinge (e.g., an axis orthogonal to the axis ζ) and then rotate the keyboard housing such that the keys face the back side of the keyboard in a folded orientation. In such an example, a single centrally located hinge provides symmetry such that a computing device can be aligned in a clamshell closed orientation and a tablet orientation, optionally with the keys of the keyboard housing facing the back side of a display of a display housing.

As an example, a single hinge may allow for spinning a keyboard housing such that a back side of the keyboard housing faces a display of a display housing. In such an example, the display may be protected by the keyboard housing.

As shown in FIG. 1, in the orientation 107, the device 100 may be oriented with the display 144 facing upwardly (e.g., with respect to gravity) and the keyboard 124 facing downwardly (e.g., with respect to gravity) or, for example, the device 100 may be oriented with the keyboard 124 facing upwardly (e.g., with respect to gravity) and the display 144 facing downwardly (e.g., with respect to gravity). As mentioned, where a keyboard housing can spin about a single hinge (e.g., a central hinge), a keyboard of the keyboard housing may be oriented facing a back side of a display housing or a back side of the keyboard housing may be oriented facing a display of the display housing. Of the various orientations, positions, etc., several include the keyboard 124 of the keyboard housing 120 facing outwardly such that it is accessible by a user, for example, for touch typing, etc. Where the keyboard 124 of the keyboard housing 120 is facing outwardly, the touchpad 123 may be accessible by a user, for example, for touching to cause touchpad circuitry of the device 100 to generate signals responsive to touch (e.g., or stylus-based input, etc.).

As an example, a device can be of a thickness of approximately 6 cm or less when in an orientation such as the orientation 107. For example, the device 100 may be of a thickness of less than approximately 6 cm when the keyboard housing 120 and the display housing 140 are folded (e.g., onto each other). Such an orientation may be a folded orientation or a closed orientation, depending on whether the keys 125 of the keyboard housing 120 are facing outwardly such that the keys 125 may function to receive input, for example, via touch-typing (e.g., a folded orientation) or not (e.g., a closed orientation).

The keys 125 of the keyboard housing 120 may be arranged according to one or more standards. For example, consider the keys 125 being arranged according to a QWERTY keyboard standard (e.g., noting that variations exist that can depend on language, consider Pinyin, or Hànyǔ Pīnyīn, etc.).

As an example, the device 100 can include an orientation sensor. For example, consider a gravitometer, an accelerometer, a gyroscope, a mercury switch or other type of fluid or mechanical switch that can operate based at least in part on orientation with respect to gravity, etc. As an example, the device 100 can include a sensor or sensors that can detect position of the keyboard housing 120 with respect to the display housing 140. For example, consider a sensor that can detect a closed orientation when a display is facing keys of a keyboard (e.g., a closed clamshell orientation), which may be a display switch module (e.g., display switch circuitry), which may operate via physical contact, magnetic field, etc. Such a sensor may be operatively coupled to power circuitry (e.g., to transition from one state to another state such as a power-off state when two housings of a device are transitioned to a closed orientation). As an example, the device 100 can include one or more sensors that can detect when the device 100 has been transitioned to the orientation 107 (e.g., and/or is otherwise in the orientation 107).

As an example, the device 100 can include an orientation sensor that can determine how the device 100 is oriented. For example, as to the orientation 107, such a sensor may determine whether the device 100 is oriented with the keyboard 124 of the keyboard housing 120 facing generally upwardly with respect to gravity or facing generally downwardly with respect to gravity (e.g., with respect to $N_1$, etc.). In such an example, the sensor can be an orientation sensor that can detect an orientation with respect to gravity.

As an example, the device 100 can include mode selection circuitry that may be operatively coupled to one or more orientation sensors such that the device 100 can switch modes responsive to orientation of the device 100 and/or how the device is oriented with respect to gravity in one or more particular orientations.

As an example, the device 100 can include a keyboard mode that can be selected by mode selection circuitry when the device 100 is oriented in the orientation 107 with the keyboard 124 of the keyboard housing 120 facing in a direction that is upward with respect to gravity (e.g., where $N_1$ is approximately 90 degrees or less with respect to gravity where an angle of 0 degrees corresponds to $N_1$ being aligned upwardly with gravity and where an angle of 180 degrees corresponds to $N_1$ being aligned downwardly with gravity).

As an example, in a keyboard mode, the device 100 may be in a particular state, which may be, for example, a power state, which may be, for example, a low power state. As an example, mode selection circuitry may transition the device 100 from one mode to another mode based at least in part on information sensed by an orientation sensor where transitioning from the one mode to the other mode includes transitioning the device 100 from one state to another state. As mentioned, a state may be a low power state, which may be low in power due to diminishing power supplied to at least the display 144 of the display housing 140 of the device 100. As an example, where the device 100 includes a network interface as one of the network interfaces 116 that can operate without powered use of one of the one or more processors 112, the device 100 may transition to a low power state where processor power is diminished.

As an example, the device 100 can include mode selection circuitry and/or other mode circuitry that can perform one or more of changing a power state, changing a power source, controlling a power level indicator, controlling a mode indicator, switching communication from one device to another device where each of the devices may optionally be paired simultaneously with the device 100, controlling a communication indicator (e.g., as to a number of devices, a status of a device, a type of device, a range of a device, a signal strength, etc.) and one or more other communication related functions. As an example, a keyboard housing such as the keyboard housing 120 may include mode selection circuitry and/or other mode circuitry, which may, for example, be activated and/or deactivated responsive to selection of a mode by the mode selection circuitry (e.g., consider transitions into and/or out of a keyboard mode, etc.).

As an example, a keyboard mode can be a mode of the device 100 where the keyboard 124 of the keyboard housing 120 is operational for wireless transmission of signals to another device (i.e., a device other than the device 100). In such an example, the other device may be, for example, a television, a game counsel, a smart home system, a household appliance, a vehicle, etc. As an example, the device 100 can include a computer mode where it can operate as a laptop or notebook computer and a keyboard mode where it can operate as a wireless keyboard that transmits information to another device that is not the device 100.

In FIG. 1, the orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

As an example, a computing device that includes a display housing and a keyboard housing can be operable in a keyboard mode. In such a mode, the computing device may be utilized to transmit information to another device, which may be another computing device, an "Internet-of-Things" device (IOT device), etc.

In some environments, a user may not want to touch another user's computer keyboard, for example, for sanitary reasons, security reasons, etc. In such an example, the user may orient her own computing device such that it enters a keyboard mode where her own computing device can transmit instructions to the other user's computer through keyboard input on her own computing device without use of the other user's computer keyboard.

As an example, in a collaborative environment, a main computing device may be utilized to display information to a screen where one or more people in the collaborative environment may orient their own computing devices to operate in a keyboard mode to interact with the main computing device. In such an example, a person or people can bring their own computing devices into the collaborative environment (e.g., a meeting room) and interact with the main computing device. In such an example, where a computing device in a keyboard mode is in a low power state, the person operating the computing device may not have to worry about bringing a power adapter to the collaborative environment as, in the low power state, battery power of the computing device may be sufficient to operate the computing device in the keyboard mode for an extended period of time (e.g., several hours or more).

As an example, when a user is watching TV (television) while working on a laptop computer, the user may wish to take a break from work. Where the laptop computer can be transitioned to a keyboard mode, the user need not worry about locating the TV's remote control; rather, the user may utilize the laptop computer in the keyboard mode to remotely control the TV. Where the laptop computer enters a low power state in the keyboard mode, the user may be less concerned about battery power drain should the user decide to return to working on the laptop computer, for example, by transitioning the laptop computer back to a suitable work mode (e.g., after controlling the TV, etc.).

As an example, a user may be in a smart environment such as a smart home environment where the user is interacting with a computing device, for example, to browse the Internet. In such an example, where the user wants to change the temperature of the smart home environment, the user may transition the computing device to a keyboard mode that allows for transmission of information to smart home environment equipment that can then cause the desired change in temperature. After effectuating the change (e.g., transmitting the appropriate instruction to the smart home equipment), the user may transition the computing device back to the prior mode, as may be suitable for browsing the Internet.

As mentioned, a device can include an orientation sensor. Such a sensor may be a hinge position sensor that can detect when a display housing is folded under a keyboard housing. As an example, for a computing device operating in a tablet mode (see, e.g., the orientation 107 of FIG. 1), an orientation sensor may detect a keyboard of a keyboard housing facing upward with respect to gravity instead of facing downward. In response, the computing device (e.g., or relevant portion thereof) can enter into a keyboard mode (e.g., a wireless keyboard mode). In a keyboard mode, a keyboard subsystem can be active, a wireless subsystem can be active and one or more switches may be switched for appropriate support mode (e.g., a BLUETOOTH® profile switch into a HID (Human Interface Device) coupling, a WiFi subsystem that switches into a WiFi direct coupling with an appropriate keyboard profile, etc.).

As an example, in a keyboard mode, a computing device may be available for pairing and/or discovery by one or more other devices (e.g., as if it were a BLUETOOTH® wireless keyboard, etc.).

As an example, a keyboard mode of a computing device may be associated with a wake but low powered state where most subsystems of the computing device are operative. In such an example, a keyboard function may be emulated in an application layer. As an alternative, in a keyboard mode, most subsystems could be powered down where an embedded controller/keyboard/BLUETOOTH® chipset (e.g., or other suitable short-range wireless embedded controller/keyboard chipset) remains powered on to host keyboard functions.

As an example, a subsystem may be operable at relatively low power. For example, consider approximately 3 mW as an average power consumption when keys of a keyboard are receiving input (e.g., typing) at a rate of approximately 300 characters per minute. As an example, a subsystem may be configured with a Bluetooth Low Energy (BLE) protocol stack, including HID over GATT Profile (HOGP) implementation (Human Input Device (HID) over Generic Attribute (GATT) Profile). As an example, a subsystem can provide for one or more levels of keyboard support (e.g., consider 128 keys (16×8 matrix)).

As an example, a device can include a processor; memory operatively coupled to the processor; a display housing that includes a display operatively coupled to the processor; a keyboard housing that includes a keyboard; a hinge assembly that operatively couples the display housing and the keyboard housing for transitions between an closed orientation, an open orientation and a folded orientation; and wireless communication circuitry that, in a wireless keyboard mode of the folded orientation, operatively couples to the keyboard. As to operative coupling of the wireless communication circuitry to the keyboard, such operative coupling can allow for transmission of information to another device via the wireless communication circuitry responsive to signals generated by the keyboard such as signals generated in response to touch-typing of keys of the keyboard by a user. For example, a user may touch a key of a keyboard where the keyboard can generate a signal (e.g., via keyboard circuitry) where the signal can be received (e.g., directly and/or indirectly) by the wireless communication circuitry and transmitted by the wireless communication circuitry to another device.

As shown in FIG. 1, the device 100 can include a processor 112; memory 114 operatively coupled to the processor 112; a display housing 140 that includes a display 144 operatively coupled to the processor 112; a keyboard housing 120 that includes a keyboard 124; a hinge assembly 132-1 and/or 132-2 that operatively couples the display housing 140 and the keyboard housing 120 for transitions between a closed orientation, an open orientation and the orientation 107 as a folded orientation; and wireless communication circuitry 116 that, in a wireless keyboard mode of the folded orientation, operatively couples to the keyboard 124.

Figure 2:
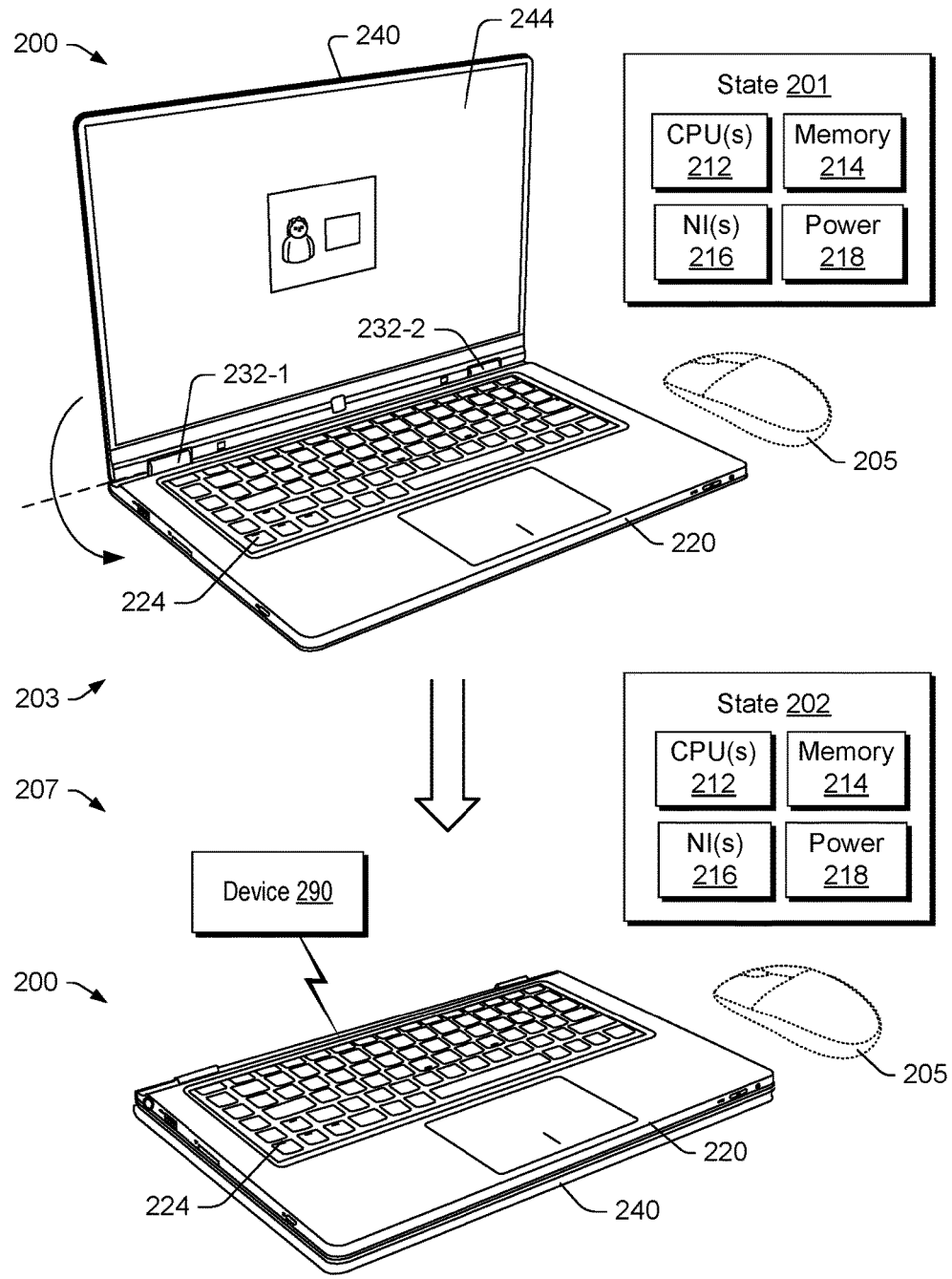
FIG. 2 is a diagram of an example of a device and examples of states of the device.

FIG. 2 shows an example of a device 200 that can include a processor 212 (or processors); memory 214 operatively coupled to the processor 212; a display housing 240 that includes a display 244 operatively coupled to the processor 212; a keyboard housing 220 that includes a keyboard 224; a hinge assembly 232-1 and/or 232-2 that operatively couples the display housing 240 and the keyboard housing 220 for transitions between a closed orientation, an open orientation and a folded orientation; and wireless communication circuitry 216 that, in a wireless keyboard mode of the folded orientation, operatively couples to the keyboard 224. In such an example, the wireless communication circuitry 216 can establish communication wirelessly with another device 290 such that input received via the keyboard 224 can allow for control of the device 290 (e.g., transmission of one or more commands that can cause the device 290 to perform one or more actions, etc.).

In the example of FIG. 2, the device 200 can include a mouse 205 and/or another human input device (HID). In the example of FIG. 2, the mouse 205 may be optional and may be coupled to the device 200 via wired and/or wireless circuitry. As an example, the mouse 205 may be communicatively coupled with circuitry of the device 200 such that information can be received by the device 200 when the device 200 is in one or more operational modes, which can, for example, include a keyboard mode (e.g., a wireless keyboard mode). As an example, the device 200 may include one or more of a TRACKPOINT® controller, a touchpad and one or more other types of HIDs that may be carried by the keyboard housing 220.

As shown in FIG. 2, the device 200 can transition from one state 201 to another state 202 responsive to transitioning of the device 200 from one orientation 203 to another orientation 207, which is shown to be a folded orientation (see, e.g., the orientation 107 of FIG. 1).

Figure 3:
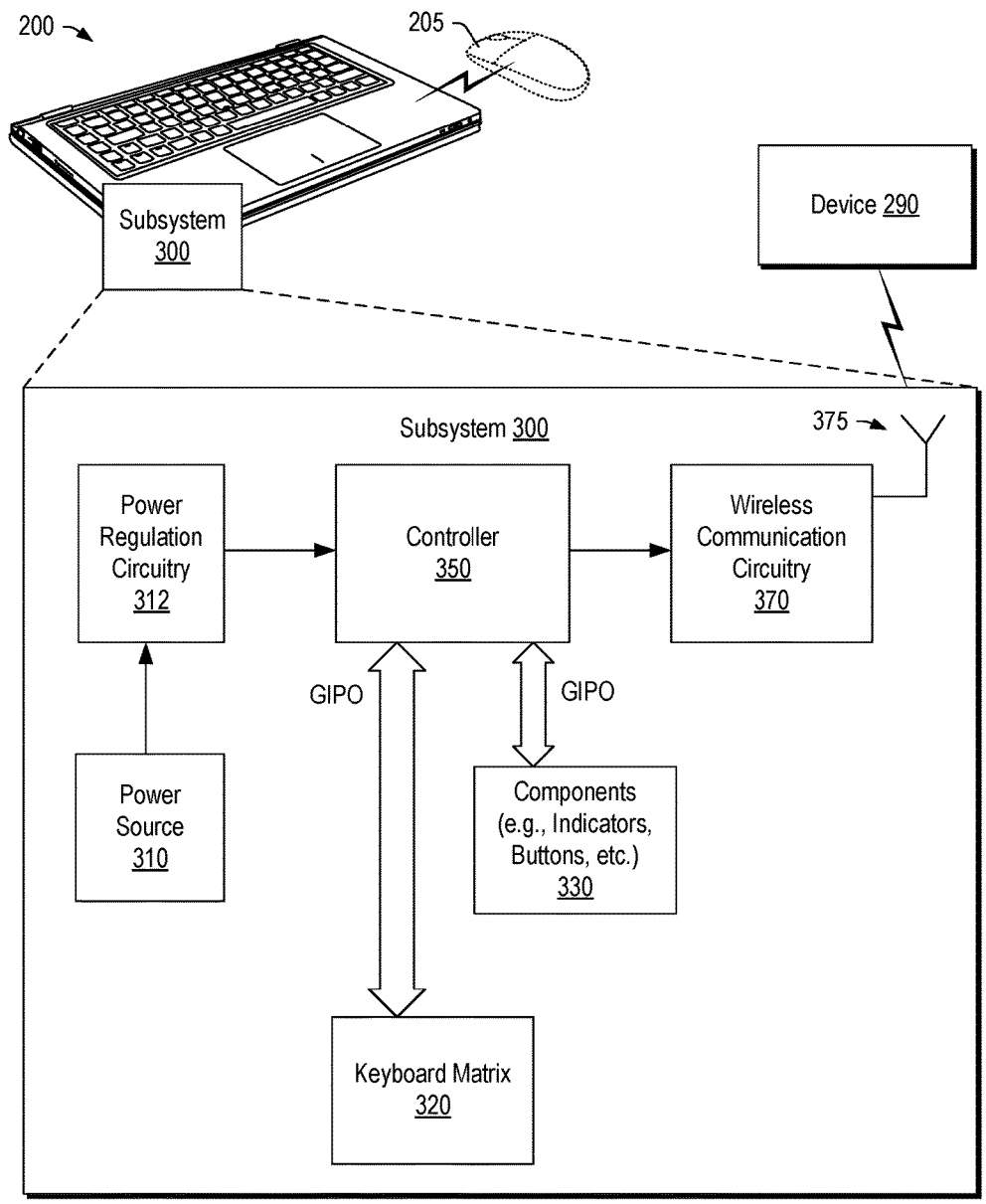
FIG. 3 is a diagram of an example of a subsystem of the device of FIG. 2 and an example of another device.

FIG. 3 shows the device 200 as including an example of a subsystem 300 that can provide for wireless communication with the device 290 (e.g., and optionally one or more other devices). As shown in FIG. 3, the subsystem 300 can include a power source 310 (e.g., one or more batteries, a power connector, etc.); power regulation circuitry 312 operatively coupled to the power source 310; a keyboard matrix 320; components 330 (e.g., one or more indicators, one or more buttons, etc.); a controller 350 operatively coupled to the power regulation circuitry 312, the keyboard matrix 320 and the components 330; and wireless communication circuitry 370 that is operatively coupled to the controller 350 and, for example, operatively coupled to an emitter 375 (e.g., an antenna, etc.).

In the example of FIG. 3, the subsystem 300 can include circuitry (e.g., integrated circuits) such as, for example, the Texas Instruments MSP430 family circuitry and/or the Texas Instruments CC2541 circuitry, which may be utilized to implement a BLUETOOTH® low energy keyboard.

The MSP430 family circuitry can include a 16-bit RISC CPU, 16-bit registers, constant generators for code efficiency, and a digitally-controlled oscillator (DCO) that allows for wake-up from low-power mode to active mode in less than about 1 µs. The MSP430G2x44 series circuitry includes ultra-low power mixed signal microcontrollers with built-in 16-bit timers, up to 32 GPIO (general-purpose input/output), and a built-in communication capability using the universal serial communication interface. In addition, the MSP430G2x44 family members have a 10-bit ND converter (analog to digital converter). Applications of the MSP430G2x44 circuitry (e.g., MSP430G244 circuitry) include sensor systems that can capture analog signals, convert them to digital values, and then process the data for one or more purposes, for example, according to one or more sets of executable instructions (e.g., software, firmware, etc., which may be stored in memory accessible by one or more components of a subsystem). As an example, processed data may be utilized for purposes of display to one or more display devices and/or for transmission to one or more devices, systems, etc. (e.g., to a host device, host system and/or another system and/or device).

The CC2541 circuitry is a power-optimized, system-on-chip (SoC) for both BLUETOOTH® low energy and/or 2.4 GHz frequency transmission applications. The CC2541 circuitry enables network nodes to be built. The CC2541 includes an RF transceiver (radio frequency transceiver) with an industry standard-enhanced 8051 micro-controller unit (MCU), in-system programmable flash memory, 8-KB RAM, and other supporting features and peripherals.

A document authored by Jiang, entitled TI Designs Bluetooth Low Energy Keyboard Reference Design (TIDU548—October 2014, Texas Instruments, Dallas, Tex.), is incorporated by reference herein. As explained in Jiang, the MSP430G244 circuitry and the CC2541 circuitry can be utilized to form a BLUETOOTH® Low Energy (BLE) keyboard. In such an approach, a host operating system (OS) of a device is to be configured to support a BLE-enabled keyboard. As an example, a WINDOWS® operating system (e.g., 8.1, etc.) can be used to establish an operating system (OS) environment of a host where the WINDOWS® OS supports a BLE keyboard through a HID over GATT profile where GATT is the Generic Attribute Profile. The HID over GATT profile defines the procedures and features used by Bluetooth Low Energy (BLE), HID Devices using GATT, and BLUETOOTH® HID hosts using GATT. As an example, a keyboard can be an HID and an operating system implemented by a device can be a host. In such an example, the keyboard as an HID can be paired with the host in a BLUETOOTH® type of pairing (e.g., paired, paired and bonded, etc.).

As an example, after a successful pairing progress, a keyboard may enter an idle mode. In the idle mode, a BLE connection may be established with a host. In such an approach, no data may be sent by the BLE radio while the keyboard waits for keystroke input (e.g., keystroke generation of signals, etc.) and the BLE radio can works periodically to keep the BLE connection alive. As to a transition to an active mode, this may occur when a user activates a key on the keyboard. In the active mode, the keystroke data can be sent out to the host (e.g., host device with established OS environment). In such an example, the keyboard can return to an idle state when no data remains while the BLE radio can, in this mode, be on full duty.

The HID over GATT Profile Specification is incorporated by reference herein, Revision V10r00 of 27 Dec. 2011 of the BLUETOOTH® SIG, Inc. According to the HID over GATT Profile Specification, an HID Device can be a GATT server, a Boot Host can be a GATT client and a Report Host can be a GATT client.

As an example, it can be up to either a GATT client or a GATT server to initiate a pairing, a bonding, and/or an encryption procedure, for example, to raise the security level of a connection. In such an example, once the security level matches the one required by the attribute's permissions, the client can send a request to be executed on the server.

As an example, if a client and a server are bonded, the client can cache attribute handles across one or more connections and expect them to remain the same; whereas, if the devices are not bonded, a client can proceed by performing discovery (e.g., upon connection to a server).

In the example of FIG. 3, the device 290 can include circuitry that may operate as a host for the subsystem 300 of the device 200. In such an example, the device 200 can be in a low power state where, for example, power may be supplied via one or more batteries, which may be rechargeable. As an example, the device 200 may include one or more non-rechargeable batteries and/or one or more rechargeable batteries that may be dedicated to a keyboard mode. For example, the power source 310 may be one or more batteries, which may optionally be user replaceable (e.g., via an access port in the keyboard housing 220 of the device 200). In such an example, the keyboard mode may operate utilizing power from the power source 310 exclusively rather than utilizing power from one or more main batteries (e.g., lithium-ion batteries, etc.) of the device 200 that are utilized in a non-keyboard mode. As an example, the keyboard mode of the device 200 may optionally (e.g., optionally selectively) utilize power from an exclusive power source of the device 200 that is exclusive to the keyboard mode (e.g., dedicated to the keyboard mode).

Figure 4:
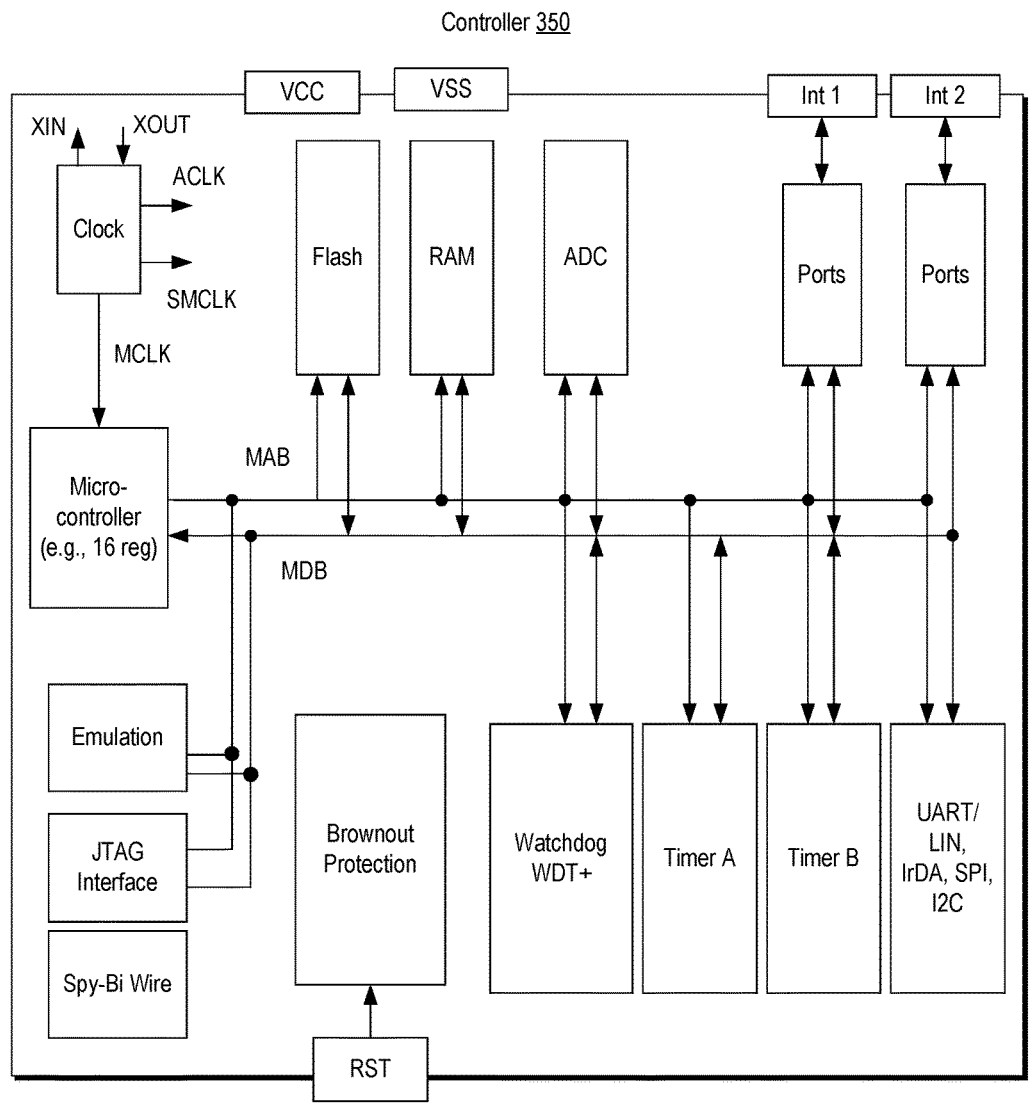
FIG. 4 is a diagram of an example of a controller.

FIG. 4 shows an approximate block diagram of an example of the controller 350 of the subsystem 300 of FIG. 3. Such a controller may include one or more features of the aforementioned MSP430 family circuitry. In the example of FIG. 4, the controller 350 is shown to optionally include features for UART, IrDA, SPI and I2C (e.g., "I²C"). As mentioned, IrDA is an infrared (IR) based transmission technology. As an example, a subsystem may include features for IR transmissions as wireless communication circuitry. As mentioned, one or more other types of EM wireless communication may be utilized.

In the example of FIG. 4, the ports of the controller 350 may be operatively coupled to one or more of keys of a keyboard and/or one or more other components that may be housed by a housing of a device such as the keyboard housing 220 and/or the display housing 240 of the device 200. As an example, a component can be an indicator. As an example, an indicator can be a light emitting component. As an example, a keyboard may be an illuminated keyboard where lighting and/or color of lighting may be controllable. As an example, a light can be an indicator as to connection status (e.g., for a BLUETOOTH® connection of a keyboard with another device). As an example, an indicator or indicators may change responsive to connection status and/or to what type of device is being connected. As an example, a plurality of indicators may be included where multiple simultaneous pairings may be established (e.g., where a keyboard mode may provide for pairing with multiple devices simultaneously and for switching between such devices utilizing a command such as a keystroke, an orientation, a direction with respect to a device, etc.).

As mentioned, a device can include an orientation sensor or orientation sensors. As an example, a subsystem may include and/or be operatively coupled to an orientation/motion framework for access to orientation and/or motion data from sensing circuitry. Such a framework may support access of raw and/or processed accelerometer data, for example, using block-based interfaces. As an example, consider a device with a gyroscope where a framework provides for retrieval of raw gyro data, processed data, etc. A framework may allow for accelerometer and/or gyro-based data to one or more applications that can utilize orientation and/or motion as input. As a particular example, consider an instance of a CMAccelerometerData class that represents an accelerometer event, which may be a measurement of acceleration along multiple spatial axes at a moment of time (e.g., typedef struct {double x; double y; double z;} CMAcceleration).

As an example, the device 100 of FIG. 1 or the device 200 of FIG. 2 can include a processor, memory and orientation and/or motion sensing circuitry, which may be in the form of one or more orientation sensors. As an example, the orientation and/or motion sensing circuitry may include multi-axis sensing circuitry such as one or more of a gyroscope and an accelerometer (e.g., consider a STMicroelectronics L3G4200D unit, a Bosch BMA220 unit, etc.). As an example, the sensing circuitry may include a tri-axial, low-g acceleration sensor with digital interfaces and/or a three-axis gyroscope.

Figure 5:
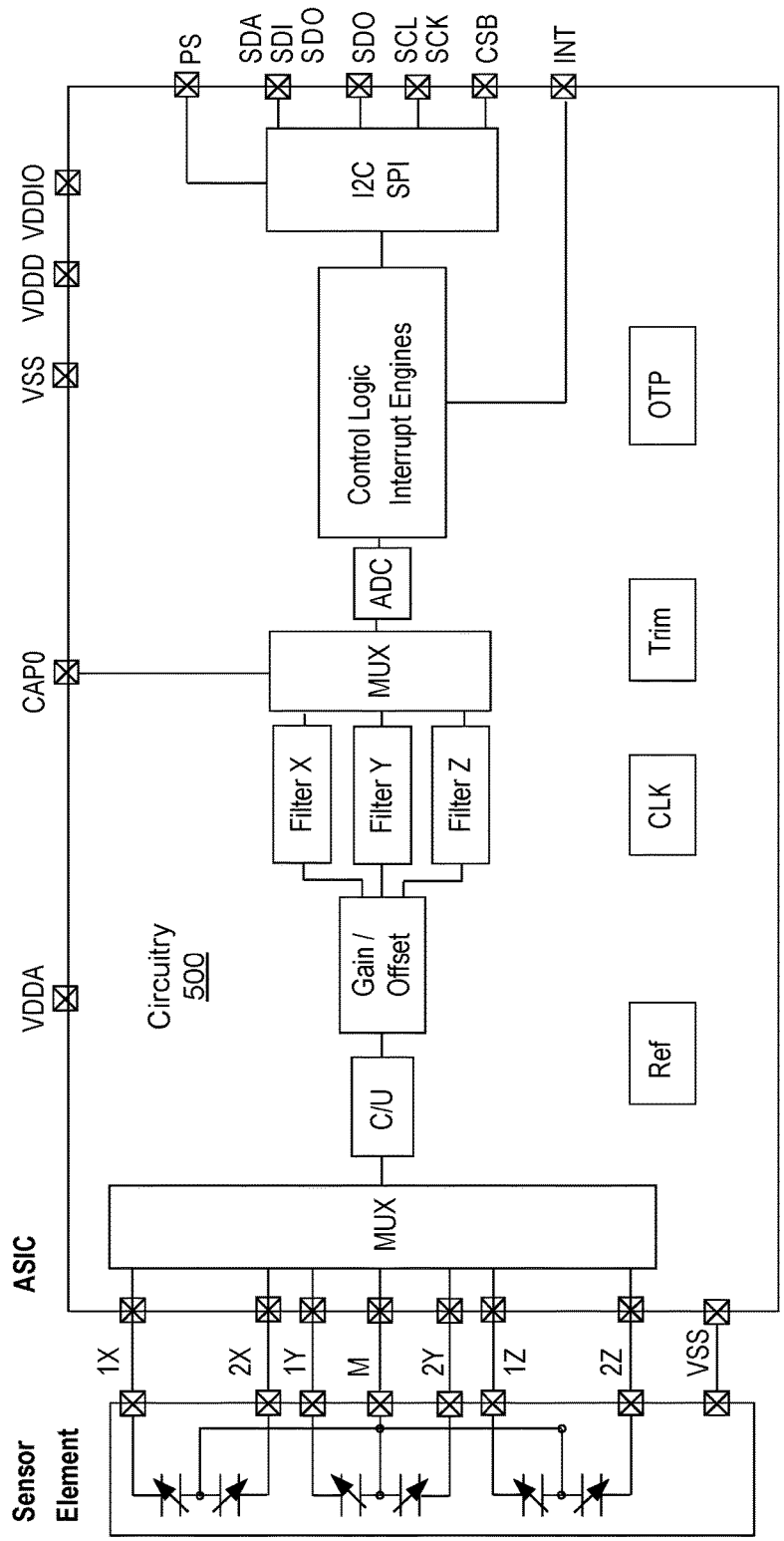
FIG. 5 is a diagram of an example of circuitry.

FIG. 5 shows an example of circuitry 500 that includes sensing circuitry (e.g., an orientation sensor). In particular, a sensor element is shown that includes x, y and z sensing circuits, which may be accelerometer circuits. As an example, the x, y and z sensing circuits may correspond to x, y and z coordinates. As an example, a coordinate system may define yaw, roll and pitch. As an example, yaw may be defined to be planar motion (e.g., rotation) and roll and pitch may be defined to be motion that tilts a plane (e.g., a geometrical plane), which may be a plane defined at least in part by an electronic device.

As shown in the example of FIG. 5, the circuitry 500 may include an I²C interface (also, e.g., "I2C") and/or an SPI interface (e.g., which may operate via receipt and/or transmission of information via one or more busses). In such an example, one or more of the interfaces of the circuitry 500 may be operatively coupled to one or more interfaces of the subsystem 300 or, for example, the circuitry 500 may be part of the subsystem 300. As an example, one or more of the interfaces of the circuitry 500 may be operatively coupled to one or more interfaces of the controller 350 as illustrated in the example approximate block diagram of FIG. 4, which shows UART (universal asynchronous receiver-transmitter), SPI (serial peripheral interface bus), I2C (inter-integrated circuit), etc., interfaces.

As an example, the circuitry 500 may include signal processing circuitry such as one or more amplifiers, multiplexers, filters, analog-to-digital converters (ADCs), control logic, interrupt engines, etc. As an example, sensing circuitry may include an ASIC that is operatively coupled to one or more sensor elements. In such an example, signals generated by a sensor element may be processed and, for example, transmitted as information via one or more interfaces, one or more busses, etc. As an example, a processor that can execute an application in an operating system environment may receive such information, process at least a portion of the information and transmit information to circuitry, which may, for example, provide for transitioning a device to a keyboard mode and/or transitioning a device out of a keyboard mode (e.g., to another mode).

As an example, information generated by an orientation sensor may be utilized to transition a device from a mode to a keyboard mode. For example, the circuitry 500 may output information that can activate circuitry of the subsystem 300 to cause a device such as the device 200 to enter a keyboard mode (e.g., a wireless keyboard mode).

As an example, a device can include digital signal processing (DSP) circuitry that can process information from such as at least a portion of the circuitry 500 of FIG. 5. As an example, DSP circuitry may provide for features such as a configurable buffer (e.g., FIFO, circular, etc.), free-fall and motion detection, transient detection (e.g., fast motion, jolt), enhanced orientation with hysteresis and optionally z-lockout, shake detection, tap and multi-tap detection, etc. As to shake detection, tap and multi-tap detection, one or more of these functions may be utilized for control of a device when operating in a keyboard mode. For example, a shake may be a gesture that causes the device to wake, pair and communicate with another device or, for example, to change from communication with one device to communication with another device, which may optionally be indicated by one or more indicators (e.g., LEDs, etc.). While shake is mentioned, tap and/or multi-tap may be utilized for gesture input that can control a device in a keyboard mode (e.g., akin to the shake functionality, etc.).

As explained, an orientation sensor can be utilized for user intended input that causes a transition of a device from one mode to another mode. In such an example, a user may intentionally orient the device in a folded orientation with a keyboard facing generally upwardly with respect to gravity such that the orientation sensor generates a signal that can be received by circuitry of the device to cause it to enter a keyboard mode, which may be implemented, for example, at least in part by circuitry of a subsystem (see, e.g., the subsystem 300). As mentioned, a keyboard mode can be a low power mode where power may be supplied by one or more power sources at a relatively low level of power drain. As mentioned, various components of a device may be powered down, which can include, optionally, powered off. As an example, "wake-on" circuitry may be utilized that polls information generated by an orientation sensor such that a transition in orientation causes the device to transition from a keyboard mode to another mode (e.g., a laptop computing mode, etc.) where components wake-up (e.g., in a higher power consumption mode).

Figure 6:
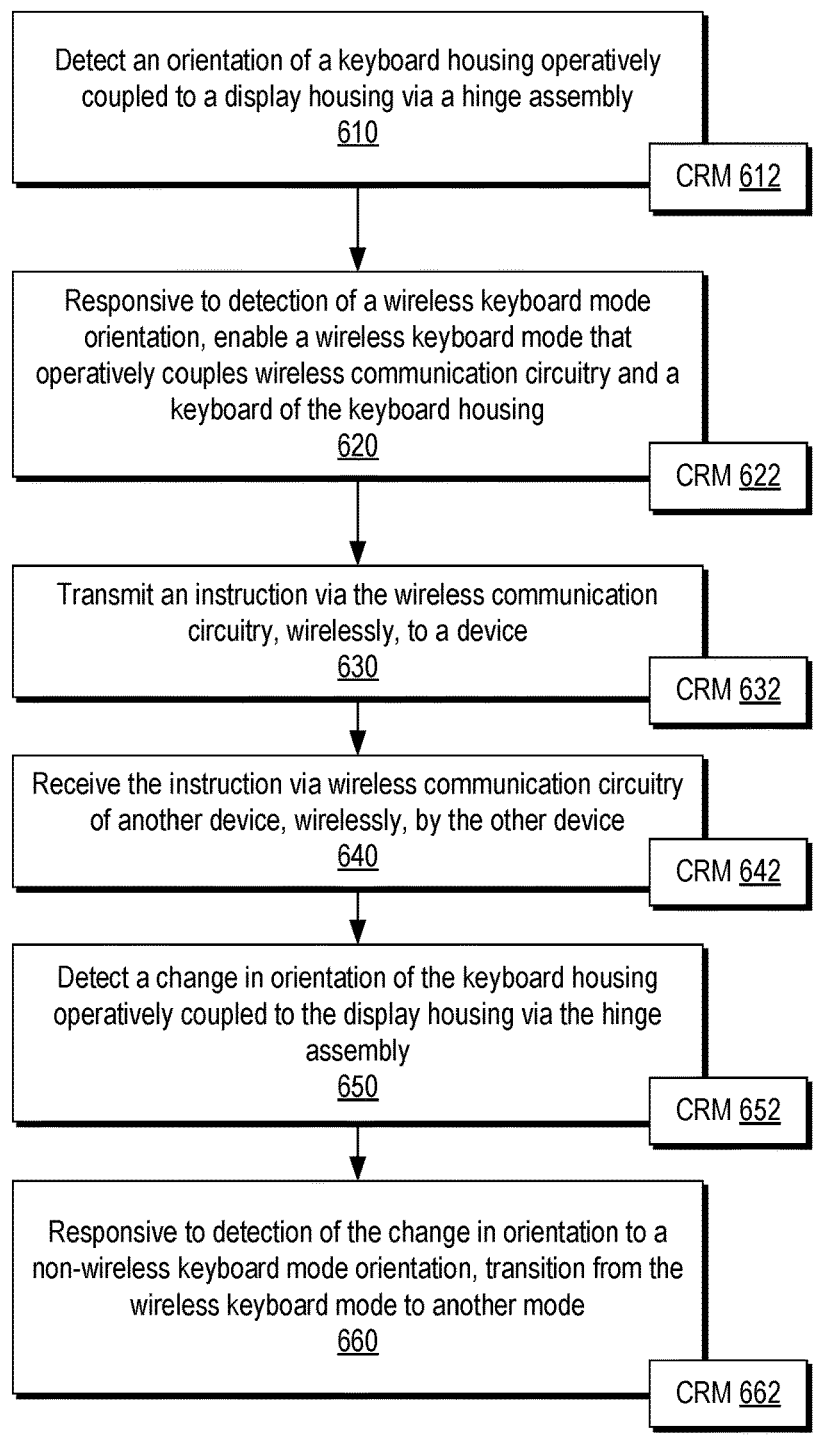
FIG. 6 is a block diagram of an example of a method.

FIG. 6 shows an example of a method 600 that can includes a detection block 610 for detecting an orientation of a keyboard housing operatively coupled to a display housing via a hinge assembly; and an enablement block 620 for, responsive to detection of a wireless keyboard mode orientation, enabling a wireless keyboard mode that operatively couples wireless communication circuitry and a keyboard of the keyboard housing.

In the example of FIG. 6, the method 600 may further include a transmission block 630 for transmitting an instruction via the wireless communication circuitry, wirelessly, to a device; a reception block 640 for receiving the instruction via wireless communication circuitry of another device, wirelessly, by the other device; a detection block 650 for detecting a change in orientation of the keyboard housing operatively coupled to the display housing via the hinge assembly; and a transition block 660 for, responsive to detection of the change in orientation (e.g., to a non-wireless keyboard mode orientation), transitioning from the wireless keyboard mode to another mode.

As shown in FIG. 6, the method 600 can be associated with one or more blocks 612, 622, 632, 642, 652 and/or 662, which may be computer-readable storage medium (CRM) blocks. Such blocks can include processor-executable instructions that are stored in a memory component that can be executed to instruct a device to perform one or more actions. In such an example, the instructions may be executable by one or more types of processing circuits (e.g., processors) such as, for example, a central processing unit (CPU), a micro-controller, etc. As an example, a block may be a firmware block. For example, a device can include a subsystem that includes associated firmware, which may, for example, respond to a signal (e.g., a trigger) that can enable and/or disable one or more features of the subsystem. As an example, an orientation sensor may be utilized that can generate a signal or signals that may be a trigger or triggers.

Figure 7:
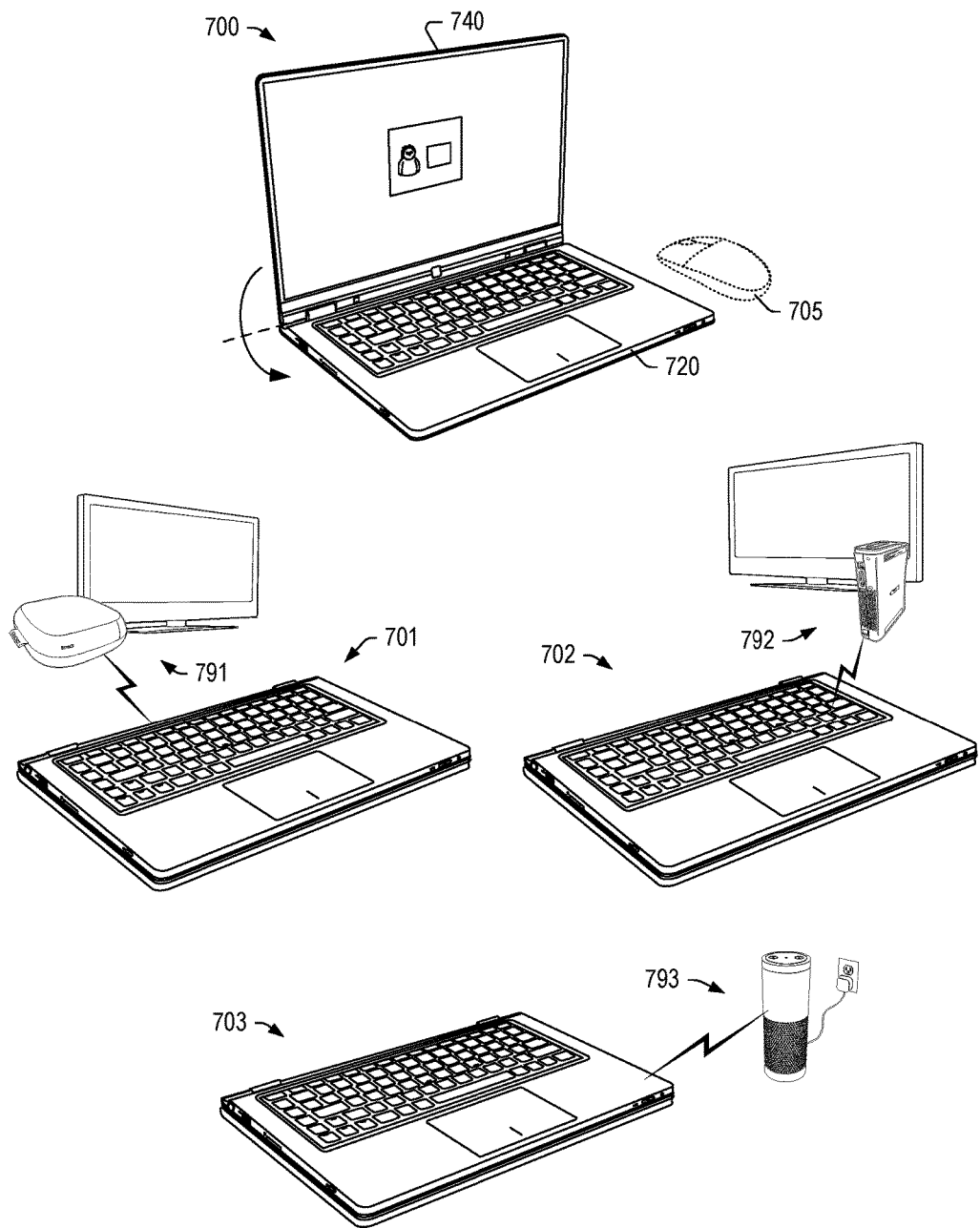
FIG. 7 is a series of diagrams of examples of scenarios of an example of a device with respect to one or more other devices.

FIG. 7 shows various examples of scenarios for a device 700 that includes a keyboard housing 720 and a display housing 740. In a scenario 701, the device 700 is in a keyboard mode where it can wirelessly transmit information to a media device 791 (e.g., a ROKU® device). In a scenario 702, the device 700 is in a keyboard mode where it can wirelessly transmit information to a game device 792 (e.g., an XBOX® device). In a scenario 703, the device 700 is in a keyboard mode where it can wirelessly transmit information to a network coupled device 793 (e.g., an ECHO® device). As an example, the device 700 may be paired with two or more of the devices 791, 792 and 793 simultaneously where a user may switch the device 700 for selective communication with one of the two or more paired devices. Such a switch may be via pointing a side of the device 700 at one of the devices 791, 792 or 793 and/or via input of an instruction (e.g., a shake, a tap, a keystroke, a TRACKPOINT® controller movement, a touchpad touch, a touchpad gesture, a voice command, etc.).

As an example, the keyboard housing 720 can include one or more indicators, which may optionally be an illuminated keyboard indicator. As an example, an illuminated keyboard indicator may optionally be configured to change color and/or to change illumination intensity with respect to one or more conditions. As an example, a condition can be a type of device to which the device 700 is connected wirelessly in a keyboard mode. For example, the device 700 may illuminate in a purple color when connected to the media device 791, the device 700 may illuminate in a green color when connected to the game device 792 and the device 700 may illuminate in an orange color when connected to the network coupled device 793. As an example, a color and/or an intensity of an indicator may change responsive to power status of a power source and/or power sources of the device 700. For example, where a battery power source goes from high to low, the indicator may change in color from blue to red. In such an example, a user may have an option to switch a power source. For example, where a device includes a "main" battery and a keyboard mode dedicated battery, an option may exist for switching from one to the other. Such an option may be via a switch, which may be a physical switch that moves (e.g., rotates, translates, etc.), a keystroke switch, and/or a switch that utilized an orientation sensor or sensors (e.g., consider tapping, shaking, etc., the device 700 in a gesture that causes switching of one power source to another).

As an example, a device can include a processor; memory operatively coupled to the processor; a display housing that includes a display operatively coupled to the processor; a keyboard housing that includes a keyboard; a hinge assembly that operatively couples the display housing and the keyboard housing for transitions between an closed orientation, an open orientation and a folded orientation; and wireless communication circuitry that, in a wireless keyboard mode of the folded orientation, operatively couples to the keyboard. In such an example, the folded orientation can further include a tablet mode. Such a device can include display circuitry that renders information to the display in the tablet mode and, for example, that does not render information to the display in the wireless keyboard mode (e.g., according to one or more settings associated with the wireless keyboard mode, etc.). As an example, a display can include associated touchscreen circuitry that is enabled in a tablet mode and, for example, that is disabled in a wireless keyboard mode.

As an example, in a wireless keyboard mode of a device, wireless communication circuitry of the device can transmit information wireless to another device responsive to actuation of keys of a keyboard of the device. In such an example, the other device may be at a distance from the device, which may be, for example, in a range of distance from approximately a few centimeters to meters. For example, consider a user of the device at a table, a desk, a sofa where the other device is a distance from the device. In such an example, in a wireless keyboard mode of the device the user may utilize the keyboard of the device to transmit information (e.g., instructions, letters, numbers, etc.) to the other device, which may be in a line of sight of the device or, for example, not in a line of sight of the device (e.g., depending on type or types of technologies of the wireless communication circuitry of the device and the other device).

As an example, a device can include one or more orientation sensors. As an example, a wireless keyboard mode of a device may be enabled based at least in part on output of at least one orientation sensor. As an example, an orientation sensor can be a proximity sensor. As an example, an orientation sensor can be a spatial orientation sensor that, for example, can determine orientation of a device with respect to gravity.

As an example, in a folded orientation, for an orientation of a keyboard of a device facing upwardly with respect to gravity, a wireless communication circuitry can operatively couple to the keyboard (e.g., in a wireless keyboard mode).

As an example, in a folded orientation, for an orientation of a keyboard of a device facing downwardly with respect to gravity, a wireless communication circuitry can be configured such that it does not operatively couple to the keyboard (e.g., consider a tablet mode).

As an example, in a wireless keyboard mode of a device, a processor of the device can be in a power state associated with the wireless keyboard mode (e.g., transitioned to such a power state responsive to entry to the wireless keyboard mode) and/or a display of the device can be in a power state associated with the wireless keyboard mode (e.g., transitioned to such a power state responsive to entry to the wireless keyboard mode).

As an example, in a wireless keyboard mode, a processor of a device can be in a low power state. For example, where such a device is in a higher power state, upon transitioning to the wireless keyboard mode, the device can transition to the low power state (e.g., for consumption of power at a level sufficient for operation of a keyboard of the device as a wireless keyboard for transmission of information to another device).

As an example, in a wireless keyboard mode, a processor of a device may be powered off. In such an example, circuitry may be enabled that can receive input via depression, touch, etc. of keys of a keyboard and that can transmit signals wireless to one or more other devices (e.g., in a selectable manner, etc.) responsive to the input.

As an example, a device can, in a wireless keyboard mode, transition a display of the device to a low power state. For example, upon a transition to a wireless keyboard mode, a device may transition a display to a lower power state or, for example, to a no power state (e.g., where the display is powered off). Such a display can be a display of a laptop computer (e.g., a laptop or a notebook). In such an example, a transition as to a power state may be effectuated via an operating system, firmware and/or another mechanism. As an example, a chipset can include instructions that can transition one or more components of the chipset to a power state or power states. As an example, a graphics processor (e.g., of a chipset, of a graphics card, etc.) may include instructions that can transition the graphics processor to a power state or power states. As an example, power circuitry of a device can be operable via circuits and/or instructions to transition one or more components of the device to a power state or power states.

As an example, a device can include power circuitry that adjusts power states of the device (e.g., and/or one or more components of the device) based at least in part on orientation of the device. In such an example, the power states may include a tablet mode power state and a different, wireless keyboard mode power state.

As an example, a device can include a plurality of batteries where one of the batteries is operatively coupled to a keyboard of the device and wireless communication circuitry in a wireless keyboard mode of a folded state of the device. As an example, a device can include a dedicated battery or batteries for circuitry of a keyboard that can transmit signals wirelessly responsive to actuation of the keyboard (e.g., touch-typing, etc.). In such an example, the dedicated battery may be actuated in a wireless keyboard mode of the device (e.g., upon transition to the wireless keyboard mode).

As an example, a device can include an indicator light that indicates that the device is in a wireless keyboard mode. In such an example, the indicator light may optionally be a backlight of one or more keys of a keyboard of the device. For example, the keyboard may "glow" in a particular color in the wireless keyboard mode that indicates that the device is in the wireless keyboard mode where, in another different mode, the keyboard may "glow" in a different color or, for example, no color (e.g., no backlighting). As an example, a device can include lighting circuitry that controls lighting of a keyboard. For example, such lighting circuitry may control lighting of the keyboard based at least in part on power level of a battery operatively coupled to the keyboard. In such an example, the color may change and/or intensity may change in a manner that depends on power level of a battery or batteries. As an example, lighting circuitry of a device may control lighting of a keyboard based at least in part on a type of wireless communication of wireless communication circuitry of the device (e.g., BLUETOOTH technology, WIFI technology, light technology, etc.).

As an example, lighting circuitry may include or may access a data structure stored in memory that associates types of wireless communication and at least one lighting parameter. For example, consider purple light for a wireless communication with a ROKU device, blue light for wireless communication with an ECHO device, green light for wireless communication with an XBOX, etc. In such an example, a user may know, as to a device in a wireless keyboard mode, which other device is currently in wireless communication therewith. As an example, a device may include a selector to switch wireless communication from one device to another device (e.g., from a ROKU device to a XBOX device). Such a selector may be a switch, a key (e.g., a keystroke or keystrokes), a touchpad, etc.

As an example, a device can include wireless communication circuitry that can establish communication with a plurality of different devices while in a wireless keyboard mode. In such an example, the device can include selection circuitry that selects one of the plurality of different devices. As an example, a keyboard housing of a device may include a remote device indicator that indicates a selected device.

As an example, a device can include display circuitry and wireless communication circuitry that operatively couples to the display circuitry in a wireless keyboard mode.

As an example, a hinge assembly of a device can include a central hinge where, in a wireless keyboard mode of the device, a display of the device faces a backside of a keyboard housing of the device (e.g., where the central hinge operatively couples (e.g., physically connects) the keyboard housing and a display housing that includes the display).

As an example, a device can include a microphone and speech-to-text circuitry where, in a wireless keyboard mode, wireless communication circuitry may be operable to transmit text instructions generated by the speech-to-text circuitry.

As an example, a device can include audio circuitry that, in a wireless keyboard mode of the device, outputs audio information.

As an example, a keyboard housing of a device may include a display, which may be a touch sensitive display (e.g., for touch input, gesture input, etc.). In such an example, the device can include circuitry that, in a wireless keyboard mode of the device, renders information to the display of the keyboard housing.

As an example, a device can include a micro-controller operatively coupled to wireless communication circuitry and a keyboard in a wireless keyboard mode of the device.

As an example, a method can include detecting an orientation of a keyboard housing operatively coupled to a display housing via a hinge assembly; and responsive to detection of a wireless keyboard mode orientation, enabling a wireless keyboard mode that operatively couples wireless communication circuitry and a keyboard of the keyboard housing. In such an example, the wireless keyboard mode orientation can be a folded orientation of the keyboard housing with respect to the display housing. In such an example, the wireless keyboard mode orientation may further include an upward orientation of the keyboard with respect to gravity. As an example, a method can include enabling a wireless keyboard mode of a device and substantially simultaneously adjusting a power state of a display of a display housing of the device.

As an example, a method can include detecting an orientation of a keyboard housing of a device operatively coupled to a display housing the device via a hinge assembly of the device; and responsive to detection of a wireless keyboard mode orientation, enabling a wireless keyboard mode that operatively couples wireless communication circuitry of the device and a keyboard of the keyboard housing. In such an example, the detecting can include receiving information from at least one accelerometer of the device, which may, for example, include information as to orientation of the device with respect to gravity (e.g., display facing generally downwardly, which may be an indicator of a wireless keyboard mode, or keyboard facing generally downwardly, which may be an indicator of another mode such as, for example, a tablet mode). In such an example, a folded orientation of the keyboard housing with respect to the display housing may provide for a tablet mode or a wireless keyboard mode in a manner that depends on orientation of the device with respect to gravity.

As an example, one or more computer-readable storage media can include computer-executable instructions that instruct a device to: detect an orientation of a keyboard housing operatively coupled to a display housing via a hinge assembly; and responsive to detection of a wireless keyboard mode orientation, enable a wireless keyboard mode that operatively couples wireless communication circuitry and a keyboard of the keyboard housing.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 8:
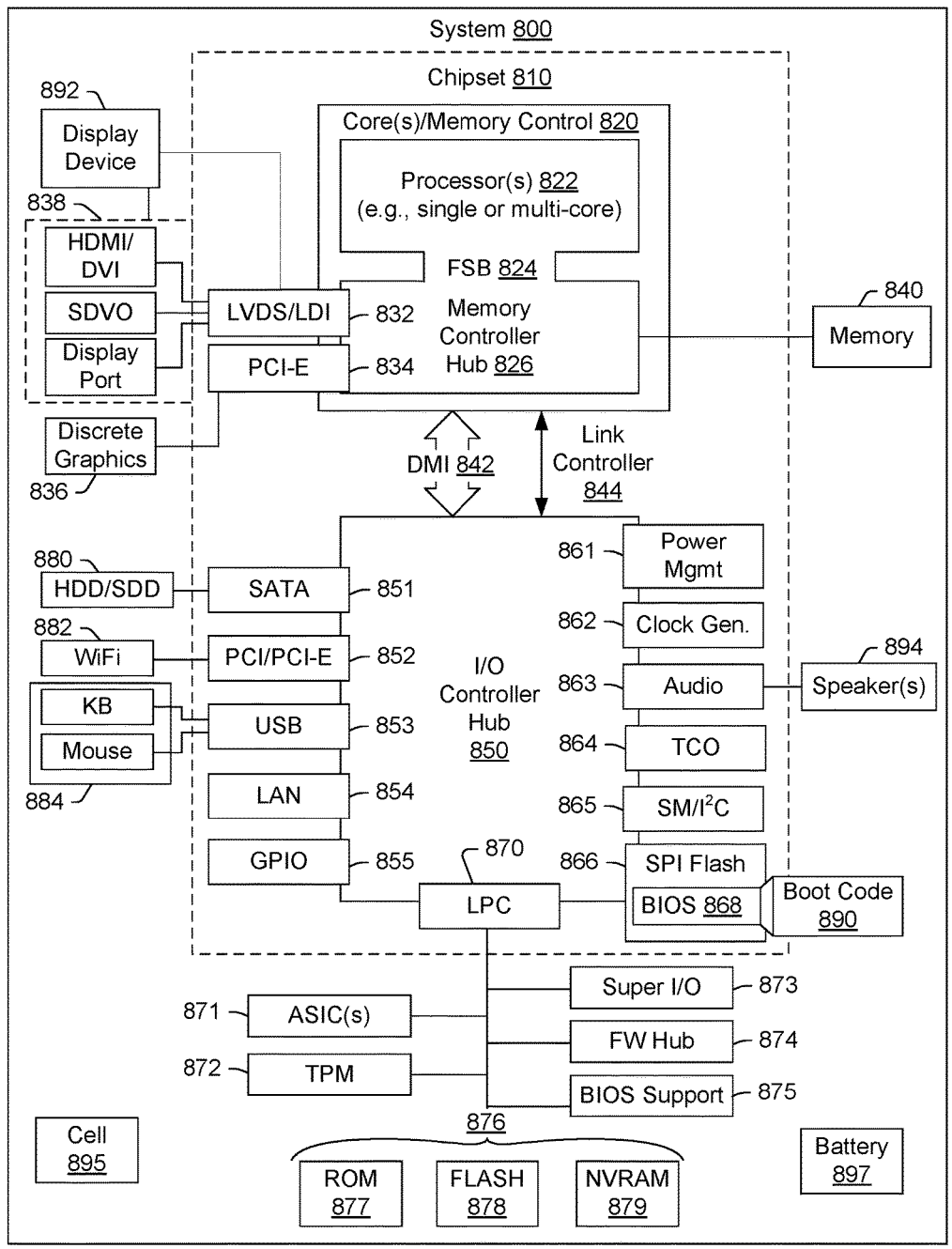
FIG. 8 is a diagram of an example of a system that includes one or more processors.

While various examples of circuits or circuitry have been discussed, FIG. 8 depicts a block diagram of an illustrative computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 800. As an example, the device 100, the device 200 and/or the device 700 can include one or more features of the system 800.

As shown in FIG. 8, the system 800 includes a so-called chipset 810. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors, mice and various other devices (e.g., microphones, cameras, phones, storage, media players, etc.). On or more other types of sensors may optionally rely on the USB interface 853 or another interface (e.g., I²C, etc.). As to microphones, the system 800 of FIG. 8 may include hardware (e.g., audio card) appropriately configured for receipt of sound (e.g., user voice, ambient sound, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8. Further, the system 800 of FIG. 8 is shown as optionally include cell phone circuitry 895, which may include GSM, CDMA, etc., types of circuitry configured for coordinated operation with one or more of the other features of the system 800. Also shown in FIG. 8 is battery circuitry 897, which may provide one or more battery, power, etc., associated features (e.g., optionally to instruct one or more other components of the system 800). As an example, a SMBus may be operable via a LPC (see, e.g., the LPC interface 870), via an I²C interface (see, e.g., the SM/I²C interface 865), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
a processor;
memory operatively coupled to the processor;
a display housing that comprises a display operatively coupled to the processor;
a keyboard housing that comprises a keyboard;
a hinge assembly that operatively couples the display housing and the keyboard housing for transitions between a closed orientation, an open orientation and a folded orientation;
an orientation sensor, wherein the orientation sensor comprises a spatial orientation sensor that determines orientation of the device with respect to gravity; and
wireless communication circuitry that, in a wireless keyboard mode of the folded orientation, operatively couples to the keyboard.

2. The device of claim 1 wherein, in the wireless keyboard mode, the wireless communication circuitry transmits information wirelessly to another device responsive to actuation of keys of the keyboard.

3. The device of claim 1 wherein the folded orientation further comprises a tablet mode.

4. The device of claim 3 comprising display circuitry that renders information to the display in the tablet mode and that does not render information to the display in the wireless keyboard mode.

5. The device of claim 3 wherein the display comprises touchscreen circuitry that is enabled in the tablet mode and that is disabled in the wireless keyboard mode.

6. The device of claim 1 wherein the wireless keyboard mode is enabled based at least in part on output of the orientation sensor.

7. The device of claim 1 wherein, in the folded orientation, for an orientation of the keyboard facing upwardly with respect to gravity, the wireless communication circuitry operatively couples to the keyboard.

8. The device of claim 1 wherein, in the folded orientation, for an orientation of the keyboard facing downwardly with respect to gravity, the wireless communication circuitry does not operatively couple to the keyboard.

9. The device of claim 1 wherein, in the wireless keyboard mode, the processor is in a power state associated with the wireless keyboard mode.

10. The device of claim 1 wherein, in the wireless keyboard mode, the display is in a power state associated with the wireless keyboard mode.

11. The device of claim 1 comprising power circuitry that adjusts power states of the device based at least in part on orientation of the device.

12. The device of claim 1 comprising an indicator light that indicates that the device is in the wireless keyboard mode.

13. The device of claim 1 wherein the wireless communication circuitry establishes communication with a plurality of different devices and wherein the device comprises selection circuitry that is actuatable to select one of the plurality of different devices.

14. The device of claim 1 comprising a micro-controller operatively coupled to the wireless communication circuitry and the keyboard in the wireless keyboard mode.

15. A device comprising:
a processor;
memory operatively coupled to the processor;
a display housing that comprises a display operatively coupled to the processor;
a keyboard housing that comprises a keyboard;
a hinge assembly that operatively couples the display housing and the keyboard housing for transitions between a closed orientation, an open orientation and a folded orientation; and
wireless communication circuitry that, in a wireless keyboard mode of the folded orientation, operatively couples to the keyboard, wherein, in the folded orientation, for an orientation of the keyboard facing upwardly with respect to gravity, the wireless communication circuitry operatively couples to the keyboard.

16. The device of claim 15 wherein, in the folded orientation, for an orientation of the keyboard facing downwardly with respect to gravity, the wireless communication circuitry does not operatively couple to the keyboard.

17. A device comprising:
a processor;
memory operatively coupled to the processor;
a display housing that comprises a display operatively coupled to the processor;
a keyboard housing that comprises a keyboard;
a hinge assembly that operatively couples the display housing and the keyboard housing for transitions between a closed orientation, an open orientation and a folded orientation; and
wireless communication circuitry that, in a wireless keyboard mode of the folded orientation, operatively couples to the keyboard, wherein, in the folded orientation, for an orientation of the keyboard facing downwardly with respect to gravity, the wireless communication circuitry does not operatively couple to the keyboard.

18. A device comprising:
a processor;
memory operatively coupled to the processor;
a display housing that comprises a display operatively coupled to the processor;
a keyboard housing that comprises a keyboard;
a hinge assembly that operatively couples the display housing and the keyboard housing for transitions between a closed orientation, an open orientation and a folded orientation wherein the folded orientation further comprises a tablet mode;
wireless communication circuitry that, in a wireless keyboard mode of the folded orientation, operatively couples to the keyboard; and
display circuitry that renders information to the display in the tablet mode and that does not render information to the display in the wireless keyboard mode.

* * * * *